Dec. 6, 1966   W. B. CONRAD   3,289,491
CONTROL ASSEMBLY
Filed Jan. 8, 1965
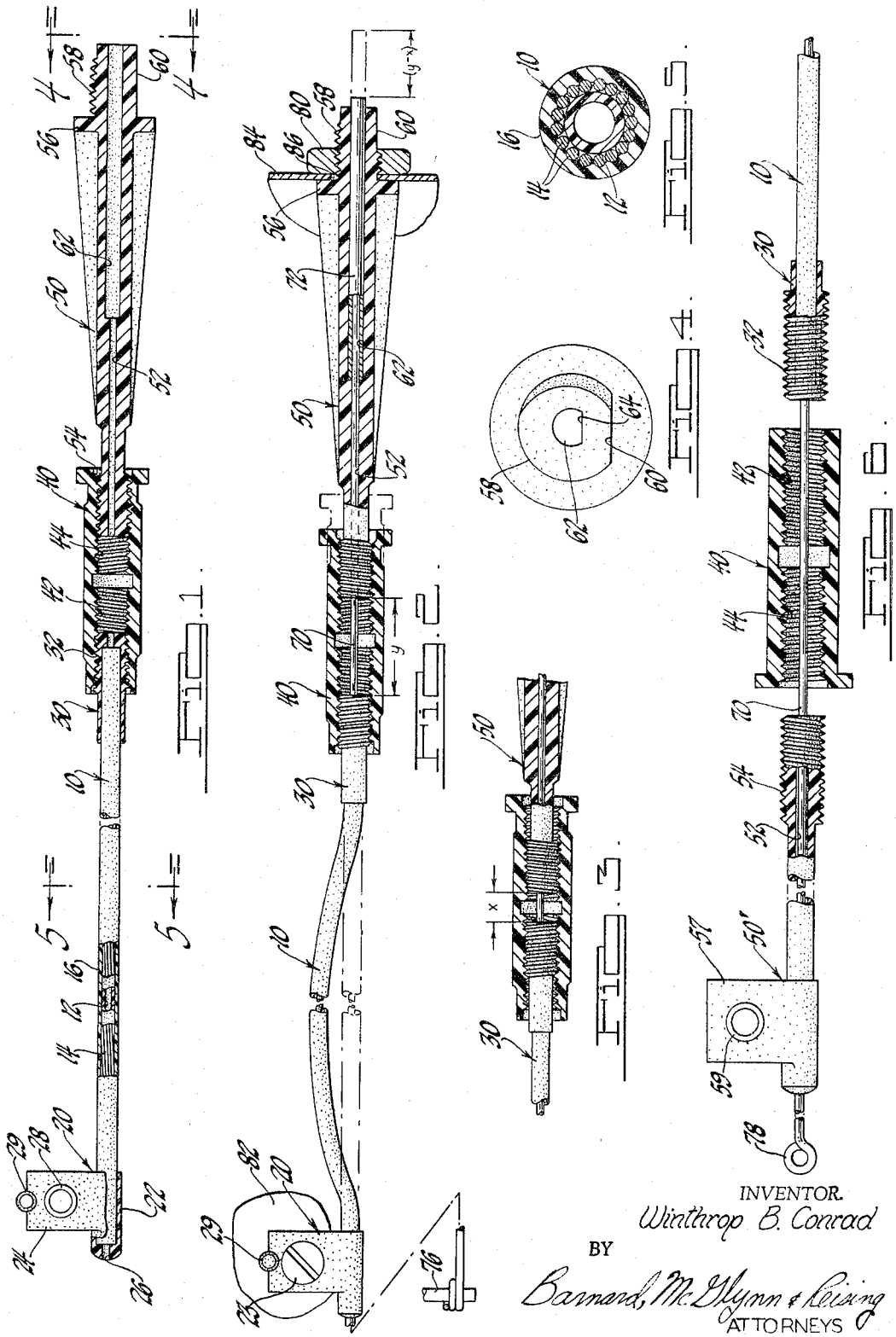
INVENTOR.
Winthrop B. Conrad
BY
Barnard, McGlynn & Reising
ATTORNEYS United States Patent Office 3,289,491
Patented Dec. 6, 1966

3,289,491
CONTROL ASSEMBLY
Winthrop B. Conrad, Franklin, Mich., assignor to Teleflex, Inc., North Wales, Pa., a corporation of Delaware
Filed Jan. 8, 1965, Ser. No. 424,333
6 Claims. (Cl. 74—501)

The present invention generally relates to a motion transmitting remote control assembly of the type comprising a guide including a flexible conduit surrounding a movable core element wherein the length of the guide is adjustable and, more particularly, to a guide utilizing a conduit which need not be severed in order to make the length of the guide adjustable.

In the past where it has been desired to provide an adjustment for such a guide, it has been the practice to cut the conduit intermediate its ends providing oppositely threaded members or fittings on the severed conduit ends and connecting the fittings through an internally threaded connector nut. This procedure has not proved entirely satisfactory since it includes a cutting operation as well as two additional operations to secure the threaded fittings on the respective severed ends of the conduit. Furthermore, provision of a threaded fitting on each of the severed ends of the conduit utilized in such a guide is sometimes nearly impossible. For example, it has been found very desirable to utilize guides having plastic surfaces supporting the movable core element so that the movable core element moves relative to the guide with a minimum of friction. The conduits utilized in such guides frequently have a plastic casing. Although such conduits reduce friction, it is very difficult and expensive to attach threaded fittings to the severed ends of such a conduit. A fitting attached to such a conduit must support the conduit in such a manner so as to prevent relative axial movement between the conduit and the fitting yet the fitting must not subject the conduit to radial forces that will deform the conduit whereby the conduit will interfere with the movement of the inner core element. It is, therefore, impossible to utilize fittings which are secured to the flexible conduit by excessive clamping forces. One solution to the problem has been to utilize plastic fittings which are molded to the outer plastic casing of the conduit. These plastic fittings are molded to the conduit in such a manner that a chemical bond is formed between the fitting and the plastic casing of the conduit thereby to secure the plastic fitting to the conduit without subjecting the conduit to radial forces which would deform it, but yet prevents the conduit from moving axially relative to the fitting. This molding procedure, however, when utilized to mold a fitting to the severed ends of a conduit so as to make a guide adjustable involves additional manufacturing operations and is expensive. Furthermore, this molding procedure is not a solution in all cases since the fitting must be made of a plastic material which is chemically compatible for bonding to the particular plastic casing of the conduit desired to be utilized in the guide and this compatability does not always exist. Therefore, the present procedure utilized to make a guide for a control assembly adjustable wherein the conduit used in the guide is severed and fittings are secured to each end of the severed conduit, is not entirely satisfactory since it is not always possible to secure the fittings to the severed ends of the conduit, and even when it is possible, it involves additional fabrication operations which are expensive.

Accordingly, it is an object and feature of this invention to provide a motion transmitting remote control assembly embodying a greatly simplified length adjusting means which includes an end fitting for mounting one end of the assembly.

Another object and feature of the present invention is to provide a motion transmitting remote control assembly of the type including a movable core element wherein the conduit utilized in the assembly need not be severed in order to make the length adjustable thereby to eliminate the need for fittings on each of the severed ends of the conduit.

Yet another object and feature of the present invention is to provide a control assembly of the type including an unsevered length of conduit and an end fitting surrounding a movable core element whereby the assembly may be installed and the distance between one end of the conduit and the end fitting may be adjusted to change the distance the movable core element extends from the end fitting.

In general, these and other objects of this invention are attained by a guide of the type utilized to surround a movable core element wherein the guide comprises a continuous length of flexible conduit having threads on one end, a substantially inflexible end fitting having threads on one end thereof, and a connector nut threadedly engaging the threads on the conduit and the threads on the end fitting whereby upon rotation of the connector nut the distance between the end of the conduit and the end of the end fitting is varied.

Other objects and attendant advantages of this invention will be readily appreciated as the same becomes better understood by reference to the following detailed description when considered in connection with the accompanying drawings wherein:

FIGURE 1 is a cross-sectional view of the guide of the instant invention;

FIGURE 2 is a cross-sectional view of the guide of the instant invention in the installed position with a phantom showing of the guide in an adjusted position;

FIGURE 3 is a cross-sectional view of the adjustment member of the guide as shown in phantom in FIGURE 2;

FIGURE 4 is an enlarged end view of the guide taken along line 4—4 of FIGURE 1;

FIGURE 5 is an enlarged cross-sectional view of the guide conduit taken along line 5—5 of FIGURE 1; and FIGURE 6 is a cross-sectional view of an alternative embodiment of the guide of the present invention.

Referring now to the drawings, wherein like reference characters indicate like or corresponding parts throughout the several views, there is shown a guide of the type utilized in a control assembly to support a movable core element. The guide comprises a flexible conduit, generally indicated at 10, a support fitting, generally indicated at 20, a threaded fitting, generally indicated at 30, an adjustment member, generally indicated at 40, and an end fitting, generally indicated at 50. FIGURE 6 discloses a guide identical to the guide shown in FIGURE 1 except the guide in FIGURE 6 utilizes an alternative end fitting, generally shown at 50'.

The instant invention is illustrated by a guide which may be utilized to support a movable core element on plastic surfaces so that movement of the core element produces a minimum of friction. Accordingly, the flexible conduit 10, as is more clearly shown in FIGURES 1 and 5, comprises an inner plastic tubular member 12, a plurality of wires 14 helically wound around the tubular member 12, and a plastic casing 16 surrounding the wires.

The support fitting 20 engages one end of the conduit 10 and comprises a tubular portion 22 with a flange 24 extending therefrom. The tubular portion 22 has an end cap 24 with a bore 26 therethrough for movably supporting a core element therein. The flange 24 has a hole therethrough with a metal insert 28 secured therein for the head of a screw or bolt or the like to bear against. As, for example, the screw 23 shown attaching the fitting 20 to a support structure 82 in FIGURE 2. A protrusion 29 extends from the flange 24 and may be utilized for insertion into an appropriate aperture in the support structure to prevent the fitting 20 from rotating when it has been attached thereto.

The threaded fitting 30 engages the conduit 10 at the end opposite to the support fitting 20. The threaded fitting 30 has threads 32 thereabout.

As mentioned above, the end fitting is illustrated in two embodiments, 50 in FIGURE 1 and 50' in FIGURE 6. The end fittings 50 and 50' each comprise an elongated member having a bore 52 therethrough and terminating in a threaded portion 54. The bore 52 is utilized to movably support a core element, such as, for example, the core element 70, shown in FIGURES 2 and 6. The fittings 50 and 50' also have means for attaching the fitting to an appropriate support structure which take the form of flanges. In the case of fitting 50, as shown in FIGURE 2, the flange 56 extends circumferentially around the end fitting so that the end fitting 50 may be secured in an aperture 86 with the flange 56 held in abutting relationship to the walls 84 surrounding the aperture by an appropriate nut 80 threaded onto the adjacent threads 58. In the case of the end fitting 50', the flange 57 lies in a plane parallel to the longitudinal axis of the fitting and has a hole with a metal insert 59 therein for inserting a suitable fastening means to attach the fitting to an appropriate support structure. The manner in which the flange 57 is attached to the fitting 50' prevents the fitting from rotating about its longitudinal axis when attached to an appropriate support structure. To prevent rotation of the end fitting 50 about its longitudinal axis, the end of the fitting which may be inserted in an aperture has a flat portion 60, which is more clearly shown in FIGURE 4. The flat portion 60 matches the aperture 86 which also has a flat portion thereby to prevent the fitting 50 from rotating about its longitudinal axis when secured in such an aperture.

The bore 52 of the fitting 50 has an enlarged portion 62 which has a flat portion 64, more clearly shown in FIGURE 4. The enlarged portion 62 of the bore 52 accommodates means to be attached to the core element 70 to move the core element. In a situation where it is desired that the core element be slidably disposed for back and forth movement within the guide, in contra-distinction to being rotatable within the guide, it may be desired to key the enlarged portion 62 of the bore 52 by having a flat portion 64 so that the means for moving the core element may have a matching flat portion thereby to prevent rotation of the core element. This feature is more clearly shown in FIGURE 2, wherein the guide is shown in the installed position and movably supporting a core element 70, which has a means for moving same comprising the bar 72 having a flat portion to match the flat portion 64.

The adjustment means 40 connects the respective end fittings to the threaded fittings 30. The adjustment means 40 takes the form of a connecting nut having a bore therethrough with threads 42 and 44 at opposite ends thereof. The connector nut coacts with the threads 32 on the fitting 30 and the threaded portion 54 of the end fitting. The threads 42 and 44 at opposite ends of the bore of the connector nut have opposite leads so that as the connector nut is rotated in one direction the conduit 10 is moved toward the end fitting 50 or 50', and as the connector is rotated in the opposite direction, the conduit 10 is moved farther away from the end fitting 50 or 50'.

There is shown in FIGURE 2 a control assembly in an installed environment. In this case a push-pull type, wherein the guide surrounds for movement therein the core element 70. The keyed bar 72 is attached to one end of the core element 70 and projects from one end of the end fitting 50. The second end of the core element 70 is secured to a movable element 76 which is to be controlled. The element 76 is movable to control a particular device such as a vent or a heater or the like in an automobile. In most installations, a knob or handle is attached to the end of the bar 72 extending from the end fitting 50 and when the core element 70 is moved to the left, as viewed in FIGURE 2, to the maximum extent, it is desired that the end of the bar 72 be in a particular position relative to the end of the fitting 50. It often occurs in the use of such control assemblies when the guide is attached to the support structure and the core element is attached to the movable elment 76, that the bar 72 does not extend the desired distance from the end fitting 50. To adjust the distance the bar 72 extends from the end of fitting 50 once the assembly is installed, the adjustment member 40 is rotated. To illustrate, assume that the guide is in the installed position and the adjustment member 40 and the conduit 10 are in the positions shown in phantom in FIGURE 2. The adjustment member 40 in this phantom position would be disposed relative to the end fitting 50 and the threaded member 30, as is indicated in FIGURE 3, where the distance between the threaded fitting 30 and the end fitting 50 is indicated as X. When the adjustment member 40 is in this position, i.e., position in FIGURE 3, the bar 72 would extend from the end fitting 50 the amount shown in phantom in FIGURE 2. To withdraw the bar 72 into the end fitting the adjustment member 40 is rotated so as to move the fitting 30 on the conduit 10 farther away from the end fitting 50 to the position shown in FIGURE 2. The resulting distance between the threaded fitting 30 and the end fitting 50 is Y, and as a consequence of the increased distance therebetween, the conduit 10 has taken a bowed position, as is shown in FIGURE 2. The distance which the bar 72 is drawn into the end fitting 50 is the difference between the distances Y and X, as is indicated in FIGURE 2. The end fitting 50', shown in FIGURE 6, with itts associated adjustment member 40 may be utilized in the same manner as end fitting 50. The only difference being that the position of the eyelet 78 of the core element 70 is changed in contradistinction to changing the position of the bar 72.

As alluded to previously, the components of the guide are preferably made of plastic materials so that the movement of the core element is with a minimum of friction. However, it is to be understood that it is within the confines of this invention to make the components of any suitable material. For example, the conduit 10 may be entirely made of plastic or it may be of a spirally wound metal wire or of any other appropriate configuration. Furthermore, in correlation with the scope of the invention as set forth above, threaded fittings such as 30 need not be employed since the threaded elements may be disposed directly on the conduit 10 when the conduit 10 is made of an appropriate material. Likewise, other suitable means besides threads on the conduit and the end fitting respectively may be utilized to coact with an adjustment member to vary the distance therebetween. Also, an adjustment means may be utilized which threadedly engages either the end fitting or the conduit and is rotatably connected to the other. It is also to be noted that the support fittings 20 and the threaded fittings 30 may be made of any appropriate material so long as the conduit may be firmly held within such a fitting to prevent axial movement of the conduit relative to the fitting without deforming the conduit to the extent that it interferes with the movement of the core element 70. Accordingly, the fittings 20 and 30 may be made of a plastic material bonded to the conduit 10 or they may be made of plastic or metal and secured to the conduit 10 by a mechanical grip. The manner in which fittings 20 and 30 may be bonded to the conduit is more particularly set forth in United States patent application Serial No. 297,900 filed July 26, 1963, now Patent No. 3,263,520 in the name of August E. Tschanz and assigned to the assignee of the present invention. A support fitting which may be secured to the conduit by a mechanical grip is set forth in U.S. application Serial No. 419,382 filed December 18, 1964, now patent No. 3,263,948 in the name of Winthrop B. Conrad and assigned to the assignee of the present invention.

The invention has been described in an illustrative manner and it is to be understood that the terminology which has been used herein is intended to be in the nature of words of description rather than of limitation.

Obviously, many modifications and variation of the present invention are possible in light of the above teachings. It is, therefore, to be understood that within the scope of the appended claims, the invention may be practiced otherwise than as specifically described.

I claim:

1. A motion transmitting remote control assembly of the type comprising a flexible conduit, a core element movably supported within said conduit, and means for adjusting the length of said assembly in which said means includes; a threaded member formed on one end of the conduit, an end fitting adapted to support one end of said conduit and terminating in a threaded portion, and a connector nut coacting with said threaded member and said threaded end fitting portion to vary the distance between said conduit and said end fitting.

2. A motion transmitting remote control assembly of the type having a guide supporting a movable core element, said assembly comprising: a flexible conduit; a support fitting connected to a first end of said conduit; thread means on the second end of said conduit, a substantially inflexible end fitting having a bore therethrough and threads about a first end thereof; said end fitting including a flange with means for attaching said end fitting to a support structure; said threads of said end fitting having a lead opposite to the threads of said thread means; a connector nut having a bore therethrough with threads at each end of said bore for respectively engaging said thread means and said threads on said end fittings; a core element movably extending through said conduit, said bore of said connector nut, and said bore of said end fitting; said core element having a first end extending from said first end of said conduit with a means for attachment to an element to be controlled; said core element having a second end extending from the second end of said end fitting with means for moving said core element, whereby said assembly may be installed by securing said support fitting and said flange of said end fitting respectively to a support structure and attaching said first end of said core element to the element to be controlled thereby to allow the distance said core element extends from said end fitting to be varied by rotating said connector nut.

3. A motion transmitting remote control assembly as set forth in claim 2 wherein said flange on said end fitting lies in a plane parallel to the longitudinal axis of said end fitting, and said means for securing said end fitting to a support structure comprises a hole in said flange whereby a means may be inserted through said hole to secure said end fitting to a support structure.

4. A motion transmitting remote control assembly as set forth in claim 2 wherein said flange on said end fitting extends circumferentially around said end fitting, and said means for securing said end fitting to a support structure comprises threads on said end fitting adjacent said flange whereby said end fitting may be inserted through an aperture with said flange abutting the material surrounding the aperture thereby to allow a nut to be threaded on said threads adjacent said flange to clamp the material surrounding the aperture between the flange and the nut.

5. A motion transmitting remote control assembly as set forth in claim 4 wherein said bore in said end fitting is keyed, and said means for moving said core element comprises a bar formed to match the keyed bore whereby said core element is slidably movable by said bar and is prevented from rotating relative to said end fitting.

6. A motion transmitting remote control assembly as set forth in claim 2 wherein said flexible conduit comprises; an inner plastic tubular member, a plurality of wires helically wound around said tubular member, and a plastic casing surrounding said wires.

References Cited by the Examiner
UNITED STATES PATENTS

| 2,373,776 | 4/1945 | Parr | 74—501 |
| 3,101,205 | 8/1963 | Benham. | |
| 3,192,795 | 7/1965 | Pierce | 74—501 |

MILTON KAUFMAN, *Primary Examiner.*